United States Patent [19]

Grange-Cossou et al.

[11] Patent Number: 5,456,813
[45] Date of Patent: Oct. 10, 1995

[54] METHOD OF JOINING A METAL CONNECTION TAB TO AN ELECTRO-CHEMICAL CELL ELECTRODE HAVING A FOAM-TYPE SUPPORT, AND AN ELECTRODE OBTAINED BY THE METHOD

[75] Inventors: Michel Grange-Cossou, Le Bouscat; Jean-Marc Guerinault, Leognan; Bernard Carteau, Begles; Joël Brunarie, Bordeaux, all of France

[73] Assignee: Societe Anonyme: Saft, Romainville, France

[21] Appl. No.: 262,036

[22] Filed: Jun. 17, 1994

Related U.S. Application Data

[63] Continuation of Ser. No. 962,211, filed as PCT/FR91/00419, May 28, 1991, abandoned.

[51] Int. Cl.⁶ .............................. C25B 11/03; H01M 4/02
[52] U.S. Cl. .................... 204/284; 204/286; 429/211; 29/623.4
[58] Field of Search .................................. 204/284, 285, 204/286; 429/211; 29/623.4

[56] References Cited

U.S. PATENT DOCUMENTS 5,077,153  12/1991  Grange-Cossou ................. 429/211

FOREIGN PATENT DOCUMENTS

| 041877 | 3/1991 | European Pat. Off. . |
| 3734131 | 12/1988 | Germany . |
| 2055899 | 3/1981 | United Kingdom . |

OTHER PUBLICATIONS

Patent Abstracts of Japan, vol. 12, No. 108 (E–597(2955) Apr. 7, 1988 & JP, A, 62 237 665 (Yuasa Battery Co. Ltd.) Oct. 17, 1987.

Patent Abstract of Japn, vol. 12, No. 80 (E–590)(2927) Mar. 12, 1988 & JP, A, 62 219 462 (Yuasa Battery Co., Ltd.) Sep. 26, 1987.

Patent Abstracts of Japan, vol. 10, No. 8 (E–373)(2065) Jan. 14, 1986 & JP, A, 60 172 177 (Sanyo Denki K.K.) Sep. 5, 1985.

Patent Abstracts of Japan, vol. 4, No. 44 (E–5)(526) & JP, A, 55 014 685 (Matsushita Denki Sangyo K.K.) Feb. 1, 1980.

Patent Abstracts of Japan, vol. 11, No. 367 (E–561)(2814) Nov. 28, 1987 & JP, A, 62 139 251 (Matsushita Electric Ind. Co. Ltd.) Jun. 22, 1987.

Patent Abstracts of Japan, vol. 6, No. 103 (E–112)(981) Jun. 12, 1982 & JP, A, 57 034 668 (Matsushita Denki Sangyo K.K.) Feb. 25, 1982.

*Primary Examiner*—Kathryn Gorgos
*Attorney, Agent, or Firm*—Sughrue, Mion, Zinn, Macpeak & Seas

[57] ABSTRACT

A metal connection tab is joined to an electrochemical cell structure having a foam-type support. The support is formed with a porosity of greater than 90%. Thereafter the support is filled with active material. A connection tab is formed of expanded metal or of perforated metal foil having perforations occupying more than 40% of its surface area, and is formed to include two branches that are fixed to each other and that are disposed on opposite sides of the support previously filled with active material. The branches are compressed against opposite sides of the support such that the three-dimensional porous structure of the support and the connection tab are caused to interpenetrate and bind together.

8 Claims, 5 Drawing Sheets

A

B

C

D

METHOD OF JOINING A METAL CONNECTION TAB TO AN ELECTRO-CHEMICAL CELL ELECTRODE HAVING A FOAM-TYPE SUPPORT, AND AN ELECTRODE OBTAINED BY THE METHOD

This is a continuation of application Ser. No. 07/962,211 filed as PCT/FR91/00419 May 28, 1991, now abandoned.

FIELD OF THE INVENTION

The present invention relates to a method of joining a metal connection tab to an electrochemical cell electrode having a foam-type support.

BACKGROUND OF THE INVENTION

It relates particularly to electrochemical cells having an alkaline electrolyte and in which at least one of the electrodes comprises a porous metal support filled with active material. The porous support has a matrix structure comparable to that of a sponge with the cells thereof being interconnected in a three-dimensional network: it is designated herein by the term "foam".

Before being filled with active material, the porosity of the foam is greater than 90%. After being filled, the electrode is compressed to specified thickness, thereby facilitating assembly and ensuring that the cell operates properly.

The cells concerned may include electrodes that are planar or that are spiral-wound.

Such an electrode is connected to a terminal of the cell by joining a metal connection tab thereto.

To implement such an operation, transposing technologies that are well-known for other types of electrodes would give rise to one of the four following methods:

- welding a metal part or an unfilled foam connection tab to the foam of the support in a weld zone which is generally not filled with active material;
- cutting out the foam of the support (optionally filled with active material) so as to provide a connection tab;
- riveting or stapling a metal part onto the foam where it is filled with active material; or
- compressing a connection tab made of unfilled foam onto the support foam where it is filled with active material.

The first method suffers from the drawback of welding having mediocre reliability when applied to thin components. An additional operation is often required to prepare the surface of the electrode for welding.

The second method gives rise to a component which is fragile and which often breaks during the subsequent operations applied thereto. In addition, cutting out a connection tab from the foam engages a cost penalty: foam is lost, possibly together with high value active material.

The third method using rivets or staples stiffens the support and as a result it becomes significantly less suitable for the bending required in spiral-wound electrodes.

The foam connection tab obtained using the fourth method is expensive and fragile.

These various methods also suffer from the drawback of reducing the active surface area of the electrodes.

An object of the present invention is to implement a joining method that does not require an additional operational stage, and that reduces the active surface area of the electrode by a negligible amount only.

SUMMARY OF THE INVENTION

The present invention provides a joining method for joining a metal connection tab to an electrochemical cell electrode having a foam-type support, wherein starting from said support having a porosity of greater than 90%, the support is filled with active material and is compressed to adjust its Thickness, the method being characterized by the fact that a connection tab is used, the tab being made of expanded metal or of perforated metal foil having perforations occupying more than 40% of its surface area, the tab including two branches that are fixed to each other and that are disposed on opposite sides of said support filled with active material, and in that the support compression operation is used to cause said connection tab to penetrate into the support.

The three-dimensional porous structures of said support and of said connection tab interpenetrate and bind together during the compression. Optimum mechanical resistance to tearing apart is thus obtained.

In a first embodiment, said connection tab defines a tongue projecting from said electrode.

In a second embodiment, said connection tab is made along an entire edge of said support. An electrode is thus obtained having a metal rim capable of being welded on its edge and which is thus interchangeable on a production line with prior art electrodes.

Preferably, the fact that said expanded metal has a mesh made up of strands of width l lying in the range one-half to three times its thickness e.

The weight per unit area of said support may lie in the range 3 g/dm$^2$ to 7 g/dm$^2$.

Said connection tab is bonded to said support over a surface lying in the range 0.1% to 60% of the surface area of the support.

The material of said support is nickel, and the material of said connection tab is selected from: nickel, nickel-plated steel, and stainless steel.

The present invention also provides an electrochemical cell electrode, characterized by the fact that it incorporates an electrical connection tab made of expanded metal or of perforated metal foil having perforations occupying more than 40% of its surface area, the three-dimensional porous structures of said support and of said connection tab being caused to interpenetrate and bind together by compression.

The advantages of the present invention are essentially as follows:

- a negligible reduction in the active surface area of the electrode since the active material of the electrode can function level with the connection tab;
- the geometrical shape of the connection tab is simple and it is simple to install during compression of the support without requiring an extra operational stage; and
- electrodes can be made that are suitable for welding on their edges, thereby making it possible to obtain electrodes whose power characteristics are greater than those of electrodes having connection "tongues", and which are interchangeable with prior art electrodes using conventional supports.

Other characteristics and advantages of the present invention appear from the following description of embodiments given by way of non-limiting example.

DESCRIPTION OF PREFERRED EMBODIMENTS

FIGS. 1A to 1D show a support 1 made of nickel foam having a weight per unit area of 3.5 grams per square decimeter ($g/dm^2$), a thickness of 1.6 mm, and filled with active material based on nickel hydroxide.

Figure 6:
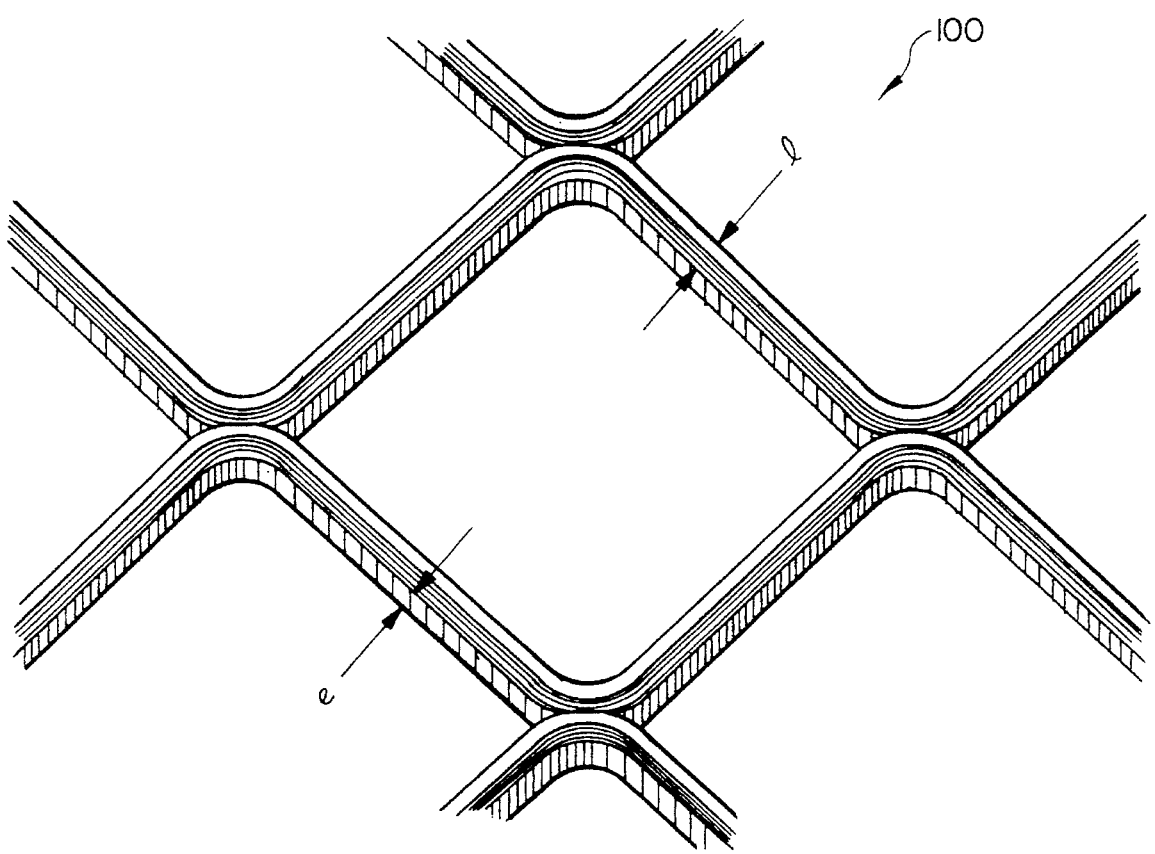
FIG. 6 is a diagram on a larger scale showing one example of expanded metal for making a connection tab of the invention.

The connection tabs are made of an expanded metal 100 that is shown in FIG. 6, which may be made of pure nickel or of nickel-plated steel, with a square mesh of diagonal 1.45 mm defined by strands of thickness e of about 0.1 mm and of width 1 of about 0.17 nm. The connection tabs given respective references 3, 7, 12, and 15 in FIGS. 1A to 1B are cut out from this expanded metal and are shaped.

Connection tab 3 comprises a planar portion 4 followed by two branches 5 and 6 for applying to respective faces 20 and 21 of the support 1.

The connection 7 comprises a planar portion 8 followed by two branches 9 and 10 for applying against the face 20 and a branch 11 for applying against the face 21.

The connection 12 is U-shaped having two branches 13 and 14 that are longer than they are wide, and the connection 15 is U-shaped, having two branches 16 and 17 that are wider than they are long, for application to the edge 18 of the support 1.

After being installed and simultaneously compressed, the support and the associated connection tabs are given respective references 1', 3', 7', 12', and 15' in FIGS. 2A to 2D and 3A to 3D.

Figure 1:
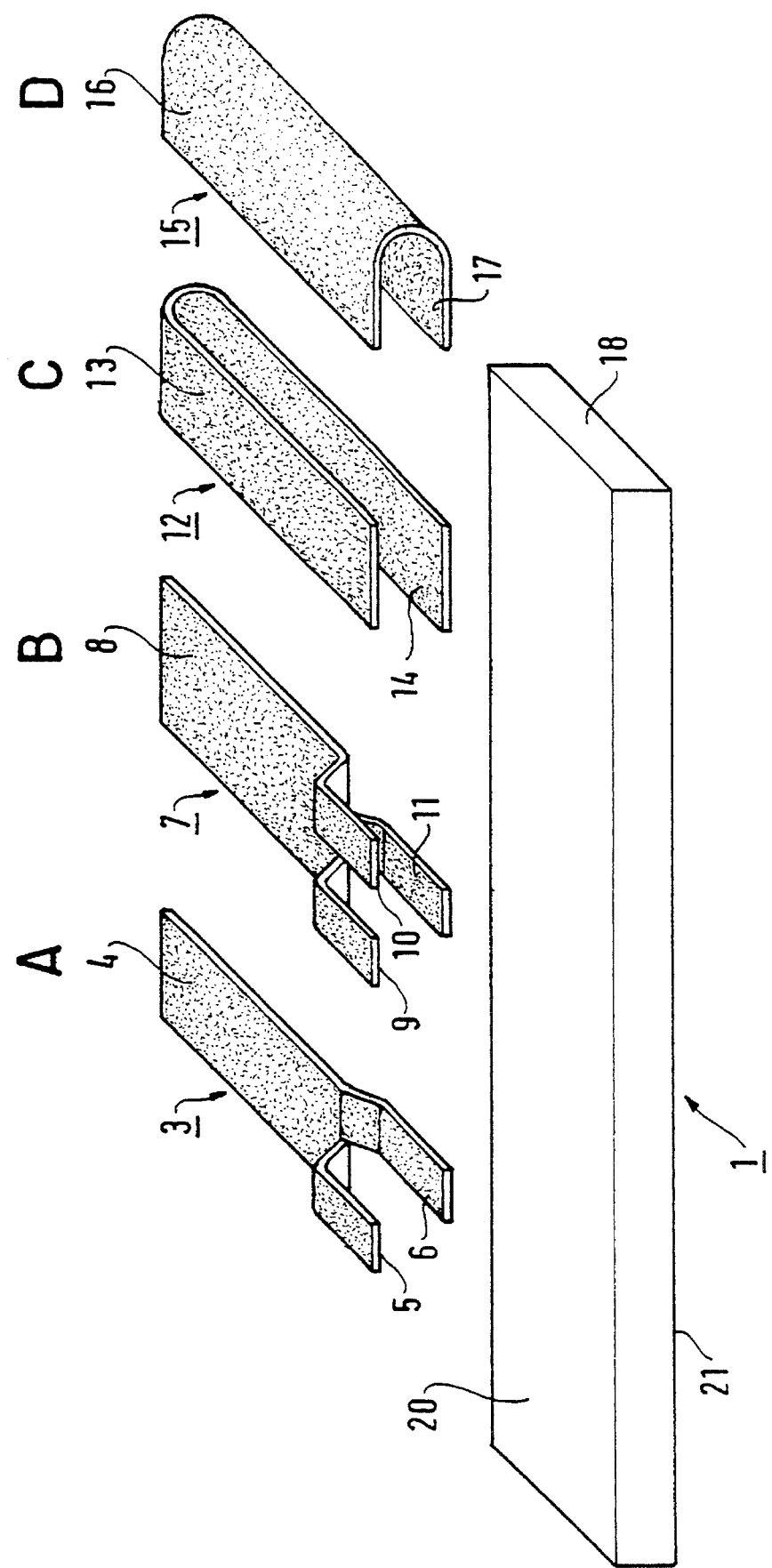
FIGS. 1A to 1D are highly diagrammatic perspective views, prior to the compression operation, of various types of connection tab for association with a foam type support to make an electrode having a connection "tongue"
Figure 2:
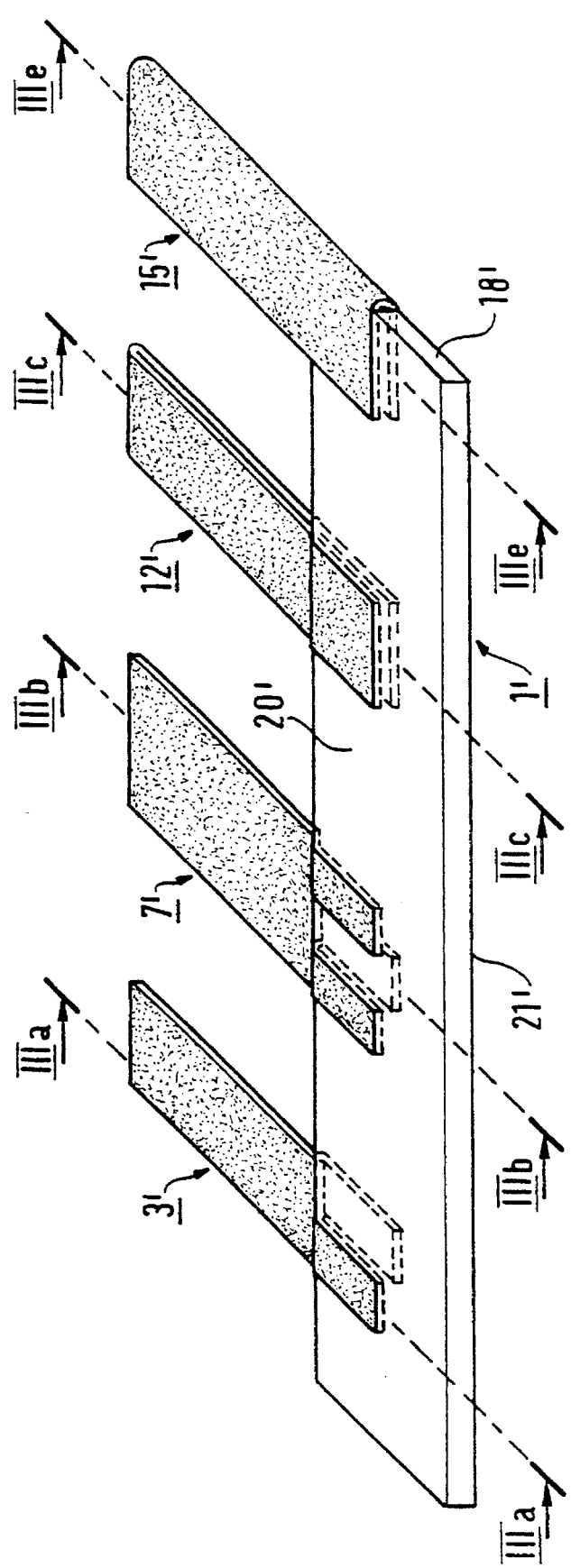
FIGS. 2A to 2D show the connection tabs and the support of FIGS. 1A to 1D after the compression operation.
Figure 3:
FIGS. 3A to 3D constitute sections on lines IIIA to IIID in FIGS. 2A to 2D.
Figure 3:
Figure 3:
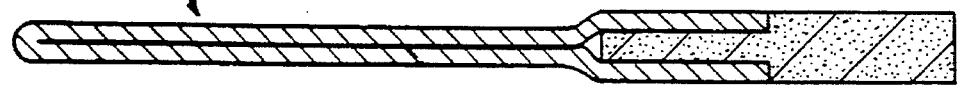
Figure 3:
Figure 4:
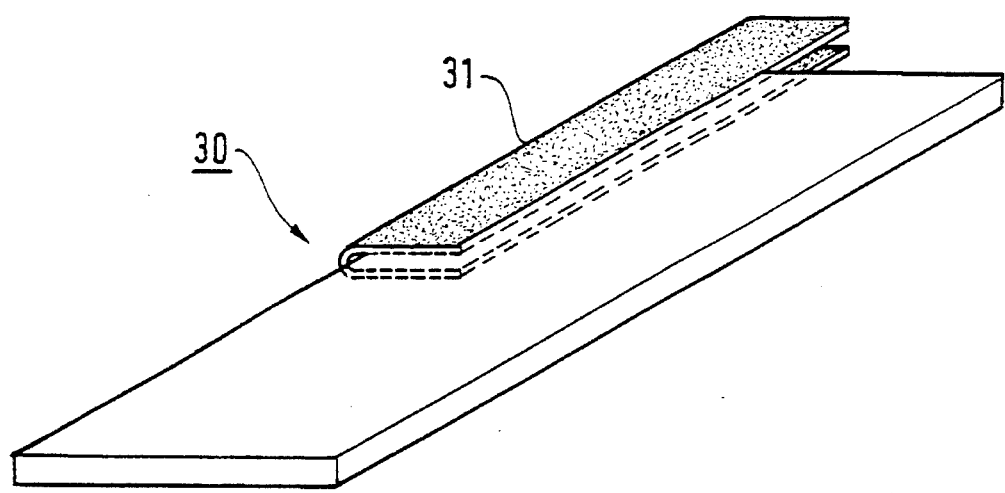
FIG. 4 is a diagrammatic perspective view of a "tongue" positive electrode for a prismatic electrochemical cell.

FIG. 4 shows a tongue type electrode having a support 30 and a connection tab 31 corresponding to the variant shown in FIGS. 1D, 2D, and 3D. The support is 14 mm wide and 38 mm high. It is filled with 15 $g/dm^2$ of active material based on nickel hydroxide. After compression, the support 30 that was initially 1.6 mm thick is 0.5 mm thick.

Electrodes made in this way may be assembled using technologies that are conventional for prismatic electrochemical cells.

In another embodiment, the support 30 is not filled with nickel hydroxide, but with 17 $g/dm^2$ of a hydridable metal alloy.

Figure 5:
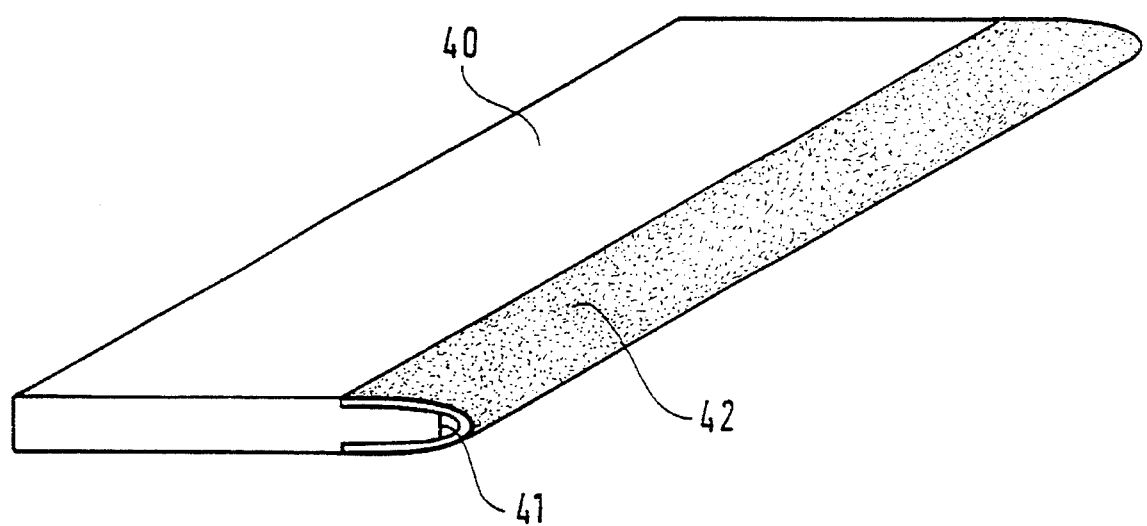
FIG. 5 is a diagrammatic perspective view of an electrode having an edge-welded connection tab of the invention.

In the variant of FIG. 5, the method of the invention is applied in a manner analogous to the variant shown in FIGS. 1D, 2D, and 3D to make a connection tab 42 along the entire edge 41 of a support 40. This support, its active material, and the expanded metal used are all analogous to FIG. 1. It is 130 mm long and 30 mm wide. It is filled with 17 $g/dm^2$ of active material. The electrode fitted with its connection tab in this way may be spiral-wound facing a cadmium-based negative electrode together with an interposed separator. It may be connected to a conventional connection tab by electrical welding, which tab is itself connected in conventional manner to the lid of the electrochemical cell.

Naturally, the invention is not limited to the embodiments described above; in particular, it is not limited to the characteristics of the foam support, to the characteristics of the active material filled therein, to the dimensions specified, or to the material used for the expanded metal. In addition, the expanded metal may be replaced by a perforated metal foil having perforations occupying more than 40% of its surface area.

We claim:

1. An electrochemical cell electrode obtained by the method consisting of:

forming an electrochemical cell electrode foam support having a porosity of greater than 90%;

filling said support with active material;

forming a connection tab of expanded metal or of perforated metal foil having perforations occupying more than 40% of the surface area of the connection tab, and forming said connection tab with two branches fixed to each other;

disposing said two branches of said connection tab on opposite sides of said support, compressing said two branches against opposite sides of said support to adjust a thickness of said support, and interpenetrating and bonding together the three-dimensional porous structures of said support and said connection tab, thereby obtaining optimal mechanical resistance to tearing apart of said interpenetrated porous structures of said support and said connection tab branches while maintaining flexibility of the electrochemical cell electrode and maximizing the active surface area of the support.

2. A method for joining a metal connection tab to an electrochemical cell electrode having a foam support, said method consisting of:

forming said foam support with a porosity of greater than 90%;

filling said support with active material;

forming a connection tab of expanded metal or of perforated metal foil having perforations occupying more than 40% of its surface area and including two branches that are fixed to each other for disposal on opposite sides of said support, disposing said branches on opposite sides of said support, and compressing said branches against the opposite sides of said support to adjust a thickness and support, said compressing step interpenetrating and binding together three-dimensional porous structures of said support and said connection tab to obtain optimal mechanical resistance to tearing apart of said interpenetrated and bound three-dimensional porous structures of said support and said connection tab while retaining flexibility of the electrochemical cell electrode and maximizing the active surface area of the support.

3. A joining method according to claim 2, wherein said step of forming said connection tab further comprises defining a tongue of said tab for projection beyond said electrode foam support.

4. A joining method according to claim 2, wherein said step of compressing said connection tab branches against opposite sides of said support comprises disposing said branches along an entire edge of said support.

5. A joining method according to claim 2, wherein said step of forming said connection tab comprises forming said tab of expanded metal having a mesh made up of strands of width 1 lying in the range of one-half to three times its thickness e.

6. A joining method according to claim 2, wherein the weight per unit area of said support lies in the range of 3 $g/dm^2$ to 7 $g/dm^2$.

7. A joining method according to claim 2, wherein said connection tab branches are compression bonded to said support over a surface lying in the range 0.1% to 60% of the surface area of the support.

8. A joining method according to claim 2, wherein the material of the support is nickel and said step of forming said connection tab comprises forming said connection tab of one material selected from a group consisting of: nickel, nickel-plated steel, and stainless steel.

* * * * *